UNITED STATES PATENT OFFICE.

HERMANN WEYLAND, HANS HAHL, AND RUDOLF BERENDES, OF ELBERFELD, GERMANY, ASSIGNORS TO FARBENFABRIKEN VORM. FRIEDR. BAYER AND CO., OF LEVERKUSEN, NEAR COLOGNE, GERMANY.

PHARMACEUTICAL COMPOUND.

1,427,182.  Specification of Letters Patent.  Patented Aug. 29, 1922.

No Drawing.  Application filed August 8, 1921. Serial No. 490,698.

*To all whom it may concern:*

Be it known that we, HERMANN WEYLAND, HANS HAHL, and RUDOLF BERENDES, citizens of Germany, residing at Elberfeld, Germany, have invented new and useful Improvements in Pharmaceutical Compound (for which we have filed applications in Germany, September 3, 1919; in Austria, August 23, 1920; Czecho-Slovakia, December 6, 1920; Switzerland, August 21, 1920; and in Japan, March 16, 1921), of which the following is a specification.

We have found that a new product for therapeutic use, being a valuable remedy against scabies, is obtained by treating toluene with sulfur and aluminium chlorid.

In carrying out the invention practically we can proceed as follows, the parts being by weight:—1000 parts of toluene, 330 parts of sulfur and 80 parts of aluminium chlorid are heated to boiling in a vessel provided with a reflux condenser until the evolution of $SH_2$ and HCl ceases. The oil is then poured into water, dried and distilled in vacuo. For further purification it can be shaken with alkali.

The new product is a yellowish oil boiling at from 150 to 230° C. under a pressure of 3 mm. It contains from 23 to 25 per cent sulfur.

We claim:

The herein-described new pharmaceutical compound being a condesation product obtained from toluene, sulfur and aluminium chlorid; being a yellowish oil boiling at from 150 to 230° C. under a pressure of 3 mm. containing from 23 to 25 per cent sulfur; and being a valuable remedy against scabies, substantially as described.

In testimony whereof we have hereunto set our hands in the presence of two subscribing witnesses.

HERMANN WEYLAND. [L. S.]
HANS HAHL. [L. S.]
RUDOLF BERENDES. [L. S.]

Witnesses:
WILHELM KREIKENBOHM,
EDUARD SONNENBERG.